Aug. 13, 1940.    J. G. CAPSTAFF    2,210,881

LENTICULAR COLOR PHOTOGRAPHY

Filed Aug. 24, 1938

JOHN G. CAPSTAFF
INVENTOR

BY
ATTORNEYS

Patented Aug. 13, 1940

2,210,881

UNITED STATES PATENT OFFICE 2,210,881

LENTICULAR COLOR PHOTOGRAPHY

John G. Capstaff, Rochester, N. Y., assignor to Eastman Kodak Company, Rochester, N. Y., a corporation of New Jersey Application August 24, 1938, Serial No. 226,504

7 Claims. (Cl. 95—2)

This invention relates to color photography employing lenticular film and, more particularly, to a novel arrangement of the color separation images formed as a group behind each lenticulation on the film.

It is well known that pictures taken on lenticular film through a banded color filter display, upon projection, color fringes on objects that were not in focus during taking. It has also been considered necessary if satisfactory results were to be obtained to maintain a very close relationship between the aperture of the taking and projecting objectives and the aperture of the lenticulations carried by the film.

The objects of the present invention are to minimize the above defects, to minimize color wedging caused by the so-called cat-eye defect, to make it possible to project both originals and copies without the necessity of changing the projection filter, to improve the apparent definition of the screen image, to make it possible to employ in projection lenses of greater aperture than that of the lenticulations without seriously affecting the visual appearance of the image and to permit diaphragming down of the camera objective without seriously affecting the color rendition.

Other objects and advantages of the invention will become apparent from the following description when read in connection with the accompanying drawing and its scope will be pointed out in the appended claims.

Figure 1:
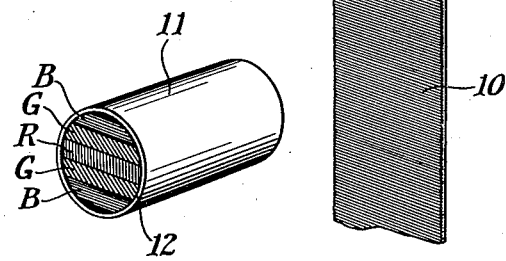
Fig. 1 is a diagrammatic view in perspective of an optical arrangement for taking or projecting lenticular color film according to the invention.

In Fig. 1 there is shown diagrammatically a motion picture film 10 provided with transverse cylindrical lenticulations positioned to receive an image formed by an objective carried in a mount 11, which objective is provided with a banded color filter 12. As is well known, the filter 12 is imaged by the lenticulations carried by the film 10 in the photographic layer provided on the rear face of the film 10.

Figure 4:
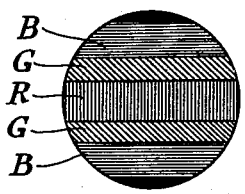
Fig. 4 is a face view of another form of color filter embodying the invention.

In accordance with the invention, the filter 12 has its parallel filter zones arranged symmetrically with respect to the optic axis of the lens carried in the mount 11 and if a three-color process such as red, green and blue is employed, the filter 12 must contain a minimum of five bands or zones which are preferably arranged as shown in Figs. 1 and 4 with the central zone red, the two outer zones blue, and the two intermediate zones green, labeled respectively, R, B and G.

Figure 5:
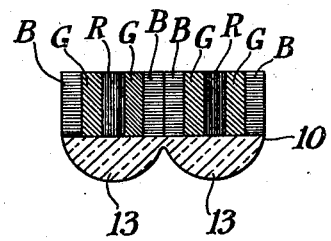
Fig. 5 is a perspective view of a fragment of film showing the color separation images taken or projected through the filter shown in Fig. 4.

With the optical arrangement shown in Fig. 1 used for taking a picture, the color separation images behind each lenticulation of the film 10 will be arranged as shown in Fig. 5 symmetrical with respect to the center line of each individual lenticule 13, i. e, the central image represents the red, the two outer images represent the blue and the two intermediate represent the green of the subject photographed.

As is clearly shown in Fig. 5, the adjacent color images between lenticulations represent the same color and accordingly any slight overlapping thereof will not, upon projection, be visually apparent and, even if visible, will not be objectionable.

Figure 2:
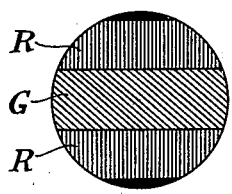
Fig. 2 is a face view of one form of my improved color filter for practicing the invention.
Figure 3:
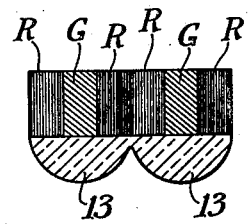
Fig. 3 is a perspective view of a fragment of film showing the arrangement of the color images with respect to the lenticulations.

It is known that satisfactory color rendition of most subjects may be obtained by employing only two colors and, if such process is desirable, a filter such as shown in Fig. 2 may be employed to practice my invention. In this case the two colors employed in the process require, in accordance with the invention, a minimum of three filter zones, the center one of which is one color, and the outer two of which are the other color. As shown in Figs. 2 and 3 the central color band is green and the two outer color bands are red. These bands are labeled respectively G and R and the film taken and projected through this filter is shown in Fig. 3. In this film the two color separation images adjacent each other between the lenticulations 13 are of the same color, in this case red. However, in practice, I prefer to employ a filter having the center band red and the two outer bands blue-green.

The primary advantages obtained by my invention will be pointed out in connection with the preferred form thereof which is illustrated in Figs. 1, 4 and 5. In projecting the film of Fig. 5 through the filter of Fig. 4, the overlapping of adjacent color separation images between the lenticulations 13 will not falsify the color rendition because they are of the same color and thus what was recorded as one color will not be projected as another color. Also the camera definition is considerably improved for the reason that the red and green images use the central zone of the lens especially when diaphragmed down to reduce the lengths of the bands and, since the blue is a color of low luminosity, the definition of the blue image is not particularly important.

Another very important advantage of the invention resides in the fact that originals and copies can be projected without changing the arrangement of the projection filter and, therefore, it becomes very simple to employ lap dissolves, fade-outs, and splicing as readily as in black and white work.

Because the red and green images are the most important visually, their arrangement as provided by the invention makes it possible to adjust to a considerable extent the diaphragm opening of the camera without adversely affecting the appearance of the projected picture while at the same time the depth of focus is increased. Also, due to the symmetrical arrangement of the filter zones, color wedging in taking and projection is avoided. This symmetrical arrangement of the color filters makes it feasible to employ projection lenses of greater aperture than that of the lenticulations 13 because the spilling over of the blue from one lenticulation to the blue of the adjacent lenticulation is not at all serious.

With the arrangement according to the invention, color fringing is minimized because the filter is in effect two adjacent tri-color filters instead of one. This arrangement lessens the separation between filter zones thereby reducing parallax approximately one-half with a corresponding reduction in color fringing.

Most of the advantages derivable from the preferred embodiment of the invention are also attributable to the embodiment illustrated in Figs. 2 and 3 and will not be repeated.

It will, of course, be understood that the spectral colors employed in practicing the invention may vary considerably and that the colors, red, green and blue, have been chosen to illustrate the invention merely because colors approximating these are the ones most generally employed.

Having thus described my invention, what I claim is new and desire to secure by Letters Patent of the United States is:

1. A polychromatic screen for use with lenticular film comprising five adjacent parallel filter zones of which the two outer zones are blue, the center zone is red and the other two zones are green.

2. A polychromatic screen for use in a lenticular film color process comprising a central band of one color, two bands of another color adjacent to and on opposite sides of the central band, and two outer bands of still another color.

3. A polychromatic screen for use in color photography employing lenticular film consisting of three adjacent parallel color bands two of which are the same color and spaced on opposite sides of the other band, said other band being a different color.

4. A banded color filter for use with lenticular film comprising five parallel zones arranged side by side, the central zone being green, the two outer zones being blue and the other two zones being red.

5. A polychromatic screen for use in color photography employing lenticular film consisting of two red filter zones arranged parallel to and on opposite sides of a green filter zone.

6. A photographic record comprising a support provided with cylindrical lenticulations and having a group of color separation images in the focal plane of each lenticulation, said group comprising at least three adjacent images the two outer ones of which correspond to one color and the center one corresponds to another color.

7. A photographic record comprising a support provided with cylindrical lenticulations on one of its faces and on its other face with a silver image comprising a plurality of color separation images consisting of line images side by side and in registration with said lenticulations, the said line images behind each lenticulation being arranged such that the central image corresponds to one color, the images on each side of said central image corresponds to another color, and the next outer images correspond to a third color.

JOHN G. CAPSTAFF.